Patented Nov. 26, 1935

2,022,003

UNITED STATES PATENT OFFICE 2,022,003

RECOVERY OF LITHIUM VALUES FROM LITHIUM BEARING ORES

Raymond J. Kepfer, Lakewood, and Robert Pfanstiel, Cleveland Heights, Ohio, assignors to The Grasselli Chemical Company, Cleveland, Ohio, a corporation of Delaware No Drawing. Application January 20, 1934, Serial No. 707,610

5 Claims. (Cl. 23—27)

This invention relates to the recovery of lithium values from lithium bearing ores, and is particularly directed to a process wherein the ores are calcined with calcium chloride in order to convert lithium compounds in the ores to soluble lithium chloride.

In the extraction of lithia from its ores, various methods have been practiced. One principal method consisted of decomposing the lithium ores with sulfuric acid. Since the common lithium bearing ores contain very small amounts of lithium, the large quantity of impurities brought into solution with the lithium made the separation of lithium salts both difficult and expensive.

It was subsequently proposed to calcine lithium ores with certain salts and bases which would release the lithium in the form of a soluble salt, and leave most of the ore undecomposed. Thus, when lepidolite is calcined with potassium sulfate, there is a reaction of the base exchange type in which the potassium replaces the lithium in the ore and the lithium replaces potassium in the potassium sulfate. The lithium is thus converted to soluble lithium sulfates which may be extracted with water from the major portion of the ore. Potassium sulfate, however, is so costly that its use in the recovery of lithium compounds is not economical.

It has also been proposed to use sodium sulfate or sodium chloride; but while these materials are quite inexpensive, they are very difficult to work with. At calcining temperatures the sodium chloride or sodium sulfate forms a sticky, viscous mass which adheres to the furnace and is difficult to handle. On cooling, the sodium sulfate or sodium chloride forms a hard, glassy cake which is difficult to process.

The use of limestone or lime has also been proposed, but the yields obtained are not high enough to make them satisfactory. To obtain even fair yields requires so much of the lime or limestone as to make the process uneconomical because of the cost of the material and the cost of calcining and extracting the resulting bulky mixture.

We have found that when lithium bearing ores are calcined with calcium chloride the lithium can be extracted from the major portion of the impurities as lithium chloride. With calcium chloride we obtain a high yield of lithium salt. Calcium chloride is relatively cheap, and its use in our process permits an economical production of lithium compounds. When lithium bearing ores are calcined with calcium chloride a soft sintered mass is formed which is easily removed from the furnace and from which the lithium salts may be extracted without grinding the cake. However, if desired, the sintered cake may be very easily ground. Moreover, when calcium chloride is used, only small amounts of such impurities as iron, aluminum, and manganese are rendered soluble by the calcination.

In the calcination of lithium bearing ores with calcium chloride there are, we have found, a number of conditions which must be closely controlled and correlated if the process is to operate with a maximum yield and at a minimum cost. Before specifically describing our processes as a whole, we shall first discuss the conditions which we have found it desirable closely to control.

In following out our process a lithium bearing ore, such as lepidolite, spodumene, etc., is finely ground prior to calcination. The yield obtained is, we have found, dependent in part upon the state of division of the ore. One batch, prior to calcining, was crushed and ground until 98% passed an 80-mesh screen. Another batch was passed an 80-mesh screen. Another batch was not so finely ground; 82% passed a 40 mesh screen, and 45% an 80 mesh screen. At a temperature of about 1450° F. the yield on the finely ground sample was 43% higher than the yield on the coarsely ground sample. When the calcination was carried out at higher temperatures, the difference in yield, while not so marked, was still rather great. At 1550° F., for example, the yield on the finely ground sample was 11% higher than on the coarsely ground sample. In the above test calcinations, the percentage of calcium chloride and all calcining conditions, other than temperature and state of division, were maintained constant.

The state of division of the calcium chloride is not so important, but it is preferred that the calcium chloride be finely ground. If flake calcium chloride (containing around 20% of water) is used, the calcium chloride tends to fuse and distribute itself through the charge. Consequently, if flake calcium chloride is used, it need not be so finely ground.

The amount of calcium chloride to be added to the lithium bearing ore is somewhat dependent upon the character of the ore, lithium content, etc. We found that when one part of lepidolite (containing about three per cent of lithia) was admixed and calcined with about two-thirds parts by weight of calcium chloride (figured on an anhydrous basis) the best results were obtained.

The amount of calcium chloride may, if desired, be decreased. The yield drops rather slowly with a decrease in the amount of calcium chloride until the amount reaches about one-third part to one of ore. The yield drops rather rapidly with further decreases in the amount of calcium chloride used.

We have found that the use of calcium chloride in amounts greater than two-thirds parts to one of ore is not particularly advantageous. The use of more calcium chloride increases the cost of material and also necessitates the furnacing and extraction of larger quantities of material.

In general we prefer to use between about one-third and about one part of calcium chloride (calculated as anhydrous) to one part of ore, and specifically we prefer to use two-thirds parts of calcium chloride to one of ore.

The temperatures used in calcination may vary widely, but they must be high enough to cause the base exchange to take place. While we have obtained fair results from about 1350° F. to about 1900° F., we prefer to operate from about 1400° F. to 1700° F.

We have found that optimum yields are obtained around 1500° F. to 1550° F. For example, with other conditions the same, a 5% higher yield was obtained at 1550° F. than at 1440° F., and a slightly higher yield was obtained at 1550° F. than at 1650° F.

We have found that the time of heating is of some importance, though not influencing the yield as much as the other conditions named. It is necessary that the heating continue only until a maximum of lithium is converted to chloride. We have found, for example, that about two hours is ample at 1550° F. Cutting the time to about one hour does not, however, reduce the yield much. When lower temperatures are used it may be desirable to lengthen the heating time, although, in general, the additional yields obtained do not justify the added expense.

While we have stated the optimum conditions for carrying out our process, it may not always be desirable to use all of such optimum conditions. The conditions may, however, be so correlated as to give the highest possible yields. For example, where one condition may not be optimum due to excessive costs in a particular case, the other conditions may be varied to lead to a high yield. If it were impractical to finely grind the ore, the resulting lower yield could be in part offset by using higher temperature, longer heating time, and larger amounts of calcium chloride. Similarly, if heating costs were excessive in a particular locality, lower operating temperatures might be used with a finer state of division of ore and slightly larger amounts of calcium chloride.

In order more fully to illustrate our invention the following specific examples are given:

*Example 1.*—Lepidolite containing about 3.21% of lithia was first crushed in a jaw crusher and then ground until 98 to 99% passed an 80 mesh screen. Twenty parts by weight of this lepidolite were intimately mixed, by grinding, with 17 parts by weight of flake calcium chloride, (13.5 parts by weight of anhydrous $CaCl_2$). The mixture was then calcined for two hours at 1550° F. After the calcination the lithium was extracted from the calcined mass with hot water. A yield of 88% of lithium as chloride was obtained.

*Example 2.*—Lepidolite containing about 3.21% of lithia was ground to somewhat coarser size than above; 82% passed a 40 mesh screen, and 45% passed an 80 mesh screen. Twenty parts by weight of this lepidolite were intimately mixed with 13.4 parts by weight of flake calcium chloride (10.6 parts by weight anhydrous $CaCl_2$) and calcined for two hours at 1550° F. Upon extracting the calcined mass with water a yield of 71% of lithium as the chloride was obtained.

Instead of using water to extract the lithium chloride from the calcined mass, other solvents of lithium chloride, such as acetone, may be used.

We claim:

1. In a process of treating lithium bearing ore, the step comprising calcining one part of the ore with not less than about one third part of calcium chloride at a temperature between about 1400° F. and about 1700° F.

2. In a process of treating lithium bearing ore, the step comprising calcining one part of the ore with between about one-third and about one part of calcium chloride at a temperature between about 1400° F. and about 1700° F.

3. In a process of producing a lithium salt from lithium bearing ore, the steps comprising calcining about one part of finely divided lithium bearing ore with about two-thirds parts of calcium chloride at about 1550° F., and extracting lithium chloride from the calcined mass.

4. In a process of recovering lithium values from a lepidolite ore, the step comprising grinding the ore so that at least forty-five per cent will pass an eighty mesh screen, calcining about one part of the ore with about two-thirds parts of calcium chloride at a temperature of about 1550° F., and extracting the solubilized lithium values with water.

5. In a process of treating lithium-bearing ore, the step comprising calcining one part of the ore with not less than about one-third part of calcium chloride at a temperature between about 1350° F. and about 1900° F.

RAYMOND J. KEPFER.
ROBERT PFANSTIEL.